Sept. 14, 1954  G. E. BATCHELDER  2,688,874
FLUID METER
Filed March 25, 1948  3 Sheets-Sheet 1
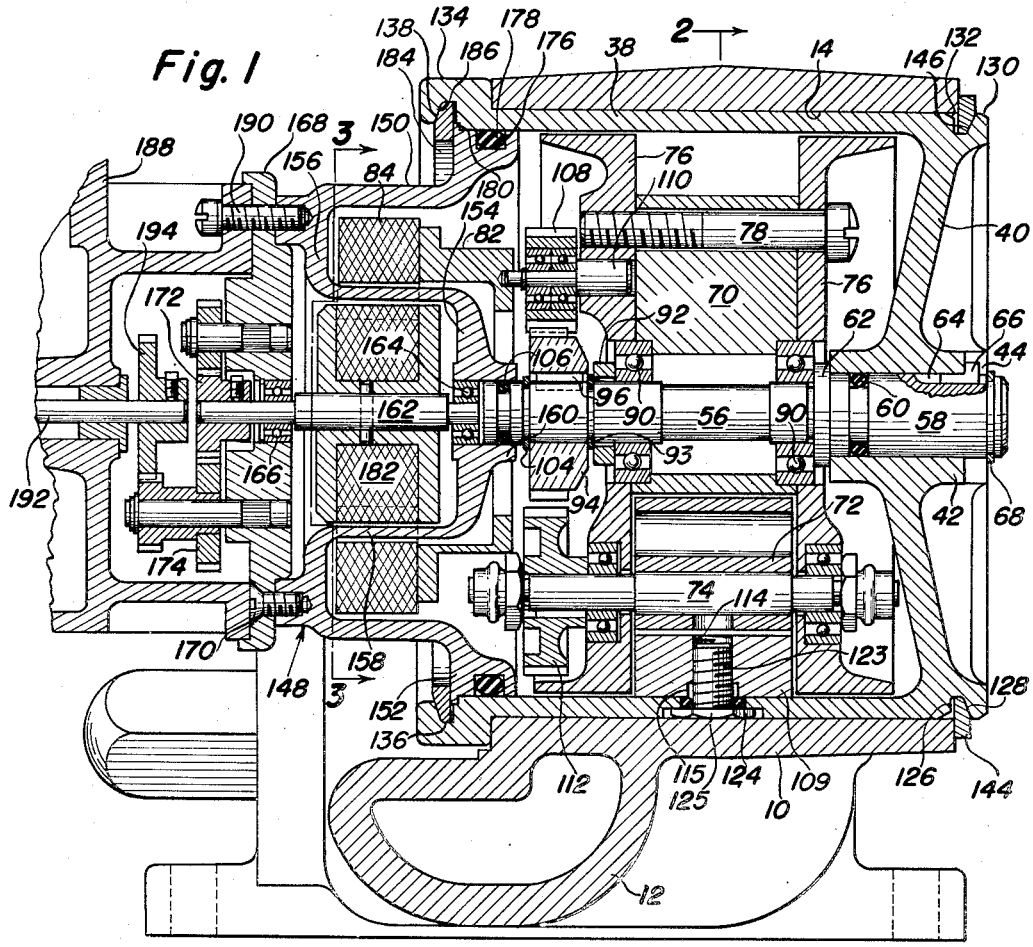
Fig. 1
Fig. 3
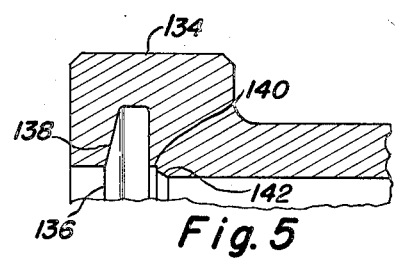
Fig. 5
Inventor
George E. Batchelder
By Strauch & Hoffman
Attorneys Sept. 14, 1954     G. E. BATCHELDER     2,688,874
FLUID METER Filed March 25, 1948     3 Sheets-Sheet 2

Inventor
George E. Batchelder
By Strauch & Hoffman
Attorneys

Inventor
George E. Batchelder
By Strauch & Hoffman
Attorneys

Patented Sept. 14, 1954

2,688,874

UNITED STATES PATENT OFFICE 2,688,874

FLUID METER

George E. Batchelder, Pittsburgh, Pa., assignor to Rockwell Manufacturing Company, Pittsburgh, Pa., a corporation of Pennsylvania Application March 25, 1948, Serial No. 16,959

11 Claims. (Cl. 73—260)

This invention relates to fluid meters and has for its general object and purpose to provide a simply constructed, inexpensive meter designed for use on aircraft to accurately measure fuel consumption, and in other instances where a light weight, efficiently operating meter of this type is required.

Another object of the invention resides in the provision of a rotary type meter with register drive means in a compactly organized unit in which the movable parts are operatively mounted or supported by a minimum number of elements of great strength having certain novel features of construction whereby the rapid and accurate assembly of said parts is facilitated.

It is an object of the invention to provide a novel division plate mounting in a rotary vane type meter which eliminates the need for clearance adjustment between the division plate and the rotor.

It is another object of the invention to provide an improved meter cylinder and rotor and driver magnet assembly with a cover closing one end of the cylinder and constructed to provide integrally connected housing sections for the driver magnet and the driven magnet respectively of the register drive mechanism.

It is a further object of the invention to provide a novel division plate construction and composition in a rotary meter which is such as to provide minimum clearance with the rotor.

With the above and other objects in view, the invention comprises the improved fluid meter and the form, construction and relative arrangement of its several parts as will hereinafter be more fully described, illustrated in the accompanying drawings and subsequently incorporated in the subjoined claims.

In the drawings I have disclosed one simple and practical embodiment of the invention and similar reference characters designate corresponding parts throughout the several views.

Figure 1 is a longitudinal section showing the meter cylinder and rotor assembled in the outer manifold casing together with a preferred form of the register drive mechanism;

Figure 3 is a similar sectional view taken substantially on the line 3—3 of Figure 1.

Figure 5 is a fragmentary sectional view on an enlarged scale of one end of the cylinder;

Figure 2:
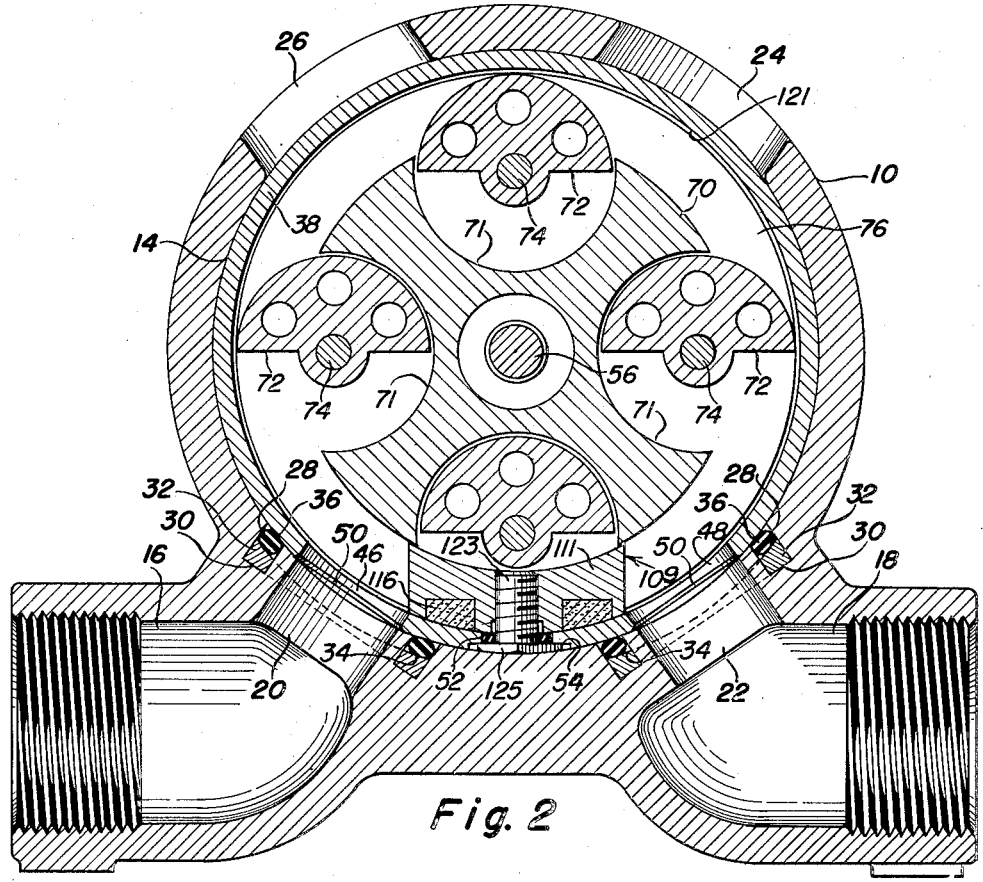
Figure 2 is a vertical sectional view through the casing and cylinder, taken substantially on the line 2—2 of Figure 1, the rotor and its supporting shaft being omitted.

In the embodiment of the invention which I have selected for purposes of illustration, the meter casing 10 and manifold 12 may be formed as a single integral casting, from aluminum alloy or other comparatively light weight metal. The finished cylinder receiving bore 14 of the casing is of uniform diameter and opens through the opposite ends of the casing.

The manifold 12 at the lower side of the meter casing is formed with oppositely extending inlet and outlet passages 16 and 18 respectively, in communication with the fluid flow ports 20 and 22 respectively, extending radially through the casing wall. Fluid under pressure is conveyed to the meter through a suitable conduit (not shown) connected with inlet passage 16, from a pump or other source of supply and from the meter through a similar conduit connected with the passage 18 to the point of utilization. Radially of the meter casing and in alignment with the respective ports 20 and 22, the wall of the casing 10 is provided with openings 24 and 26 respectively. By means of a suitable tool inserted through these openings, a trepanning operation may be trans-axially performed to cut a continuous groove 28 in the inner cylindrical face of the casing wall in accurately concentric relation to each of the respective ports 20 and 22. These grooves are of predetermined depth, and their base walls 30 are disposed in planes substantially normal to the axes of the respective ports.

Before mounting the rotor and cylinder assembly, to be presently described, in the casing 10, a filler ring 32 is inserted into each of the grooves 28 with the lower flat surface of the ring in contact with base wall 30 of the groove. The upper annular surface 34 of each ring 32 is concave and substantially in parallel concentric relation to the internal surface of the casing wall. Upon this concave surface 34 of each filler ring, a sealing ring 36 of synthetic rubber or other suitable elastically deformable material is inserted into the upper portion of each groove 28 and normally is of such diameter that it projects from the open sides of the grooves slightly above the inner face of the casing wall before insertion of the cylinder 38.

The cylinder 38 is of steel or other suitable metal alloy having the required strength and physical characteristics and at one of its ends is closed by an inwardly inclined wall 40 which is formed with an inwardly and outwardly extending hollow boss 42 coaxial with the cylindrical wall to receive one end of a rotor supporting shaft. The outer end face of the boss 42 is provided with a diametrically disposed slot 44.

The wall of the cylinder 38 is also provided with circumferentially spaced ports or openings 46 and 48 respectively of approximately the same diameter as the ports 20 and 22 in the wall of casing 10, with which they are respectively adapted to register. Preferably a shallow countersink 50 is formed in the outer face of the cylinder wall surrounding each of the ports 46 and 48. Between these ports, the cylinder wall is provided with a relatively small diameter opening 52 having a counterbore 54 at the outer side of the cylinder wall, for a purpose which will be later explained.

The rotor shaft 56 has a diametrically enlarged end portion 58 adapted to be inserted in the bore of the boss 42 and near its inner end carries a conventional type fluid seal indicated at 60. This end of the shaft portion 58 terminates in a stop flange 62 that abuts the inner end of boss 42 and prevents axial movement of the shaft in one direction. The outer end of shaft portion 58 is provided with a longitudinal keyway 64 to receive one portion of an L-shaped key 66, the other end portion of which extends radially outward into slot 44 of boss 42 and thereby locks shaft 56 against rotation relative to cylinder 38. The end of the shaft is also provided with an annular groove to receive the split locking ring 68 which abuts the outer end of the boss 42 and prevents axial movement of shaft 56 in the opposite direction.

Figure 4:
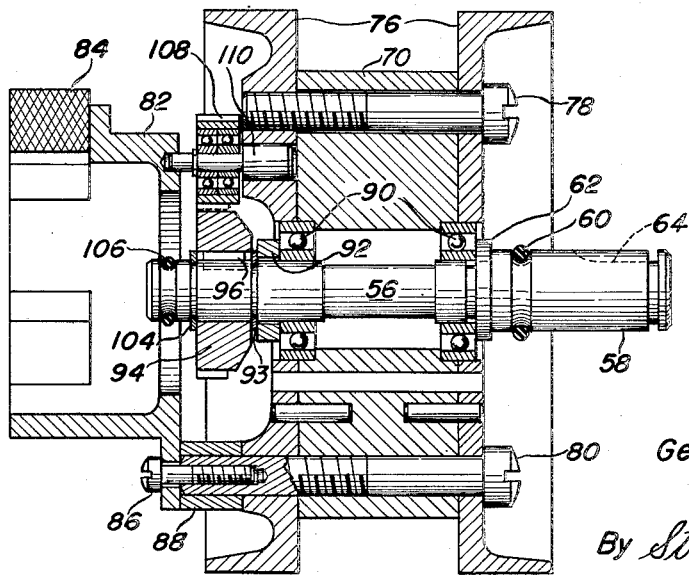
Figure 4 is a sectional view substantially on line 4—4 of Figure 3 of the rotor and driver magnet assembly before mounting the rotor in the cylinder.
Figure 6:
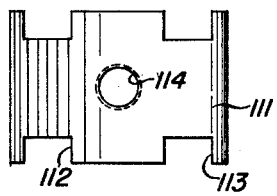
Figure 6 is a top plan view of the division plate frame.

The rotor is preferably of the rotary vane type. As shown in Figure 1, this rotor essentially comprises a cylindrical body member 70 having a plurality of circumferentially spaced surface pockets 71 for the rotary vane 72. Rotor vane shafts 74 are journalled in rotor side members 76 which are rigidly secured to the opposite sides of rotor body 70 by bolts 78 and 80, the latter being relatively long as illustrated in Figure 4. A carrier 82 for the driver magnets 84 of the register operating mechanism is provided with apertured ears to receive screws 86 engaged in threaded bores in one end of the bolts 80. Suitable spacers 88 surround said bolts between rotor member 76 and carrier 82.

The rotor is supported for free rotation upon fixed shaft 56 by spaced anti-friction bearings 90, one of which contacts the flange 62 on shaft 56 in the assembly and limits axial movement of the rotor relative to the shaft in one direction. At the other side of the rotor, bearing 90 is held in contact with a collar 92 loosely surrounding shaft 56, a groove and spring snap ring 93 being provided for this purpose. Beyond collar 92 and snap ring 93, a sun gear 94 is non-rotatably mounted on shaft 56 by a suitable key 96. After gear 94 is keyed on the shaft, a spring stop ring 104 is snapped into a peripheral groove on the shaft at the outer side of the gear to cooperate with ring 93 to limit axial movement thereof.

The sun gear 94 is in constant mesh with idler gears 108 suitably journaled upon stud shafts 110 fixed in one of the side members 76 of the rotor and supported at their outer ends in carrier 82. These idler gears in turn are in constant mesh with adjacent gears 112 fixed to one end of the projecting vane shafts 74. Thus, as the rotor revolves, uniform rotation is transmitted to the several vanes 72 within the rotor pockets so that the vanes will be properly positioned to deliver fluid in measured volume from the inlet port 46 of the cylinder to the outlet port 48 thereof. This operation is similar to that disclosed in Marsh Patent No. 2,274,206 to which reference is made for further detail of both structure and operation.

It is an important phase of the present invention to provide a construction and method of assembly that enables the rotor and cylinder to be assembled and pretested prior to introduction into any casing or like support. This is made possible by securing the stationary division plate member 109 which coacts with the rotor in place by a fluid tight fastening means which locates it adequately between the end members of the rotor and does not interfere with axial insertion of the cylinder into the meter casing.

Referring to Figures 1, 2 and 6–15, the division plate member structure according to this preferred embodiment of the invention comprises a metal block or frame 111 of the shape illustrated in Figures 6–9 having arcuate generally cylindrical upper and lower surfaces and flat ends and sides. Near each end, frame 111 is formed along its bottom and sides with continuous recesses 112 and 113 of generally rectangular cross section, and it is substantially centrally formed with a threaded bore 114 having an enlarged counterbore 115 in the lower surface of frame 111.

Figure 10:
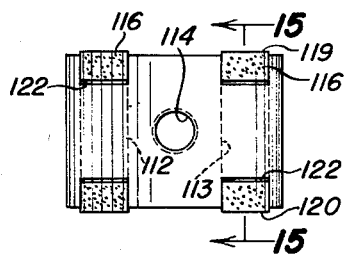
Figure 10 is a top plan view of the division plate assembly.
Figure 7:
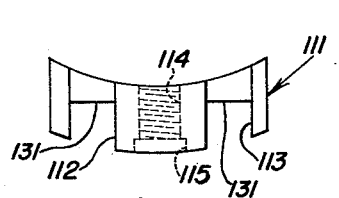
Figure 7 is a side view of the division plate frame of Figure 6.
Figure 8:
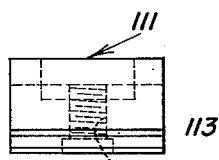
Figure 8 is an end elevation of the division plate frame of Figure 6.
Figure 11:
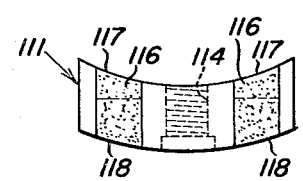
Figure 11 is a side elevation of the division plate assembly.
Figure 9:
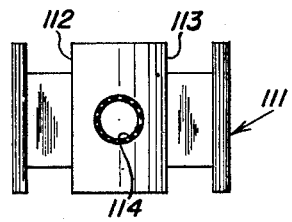
Figure 9 is a bottom plan view of the division plate frame of Figure 6.
Figure 12:
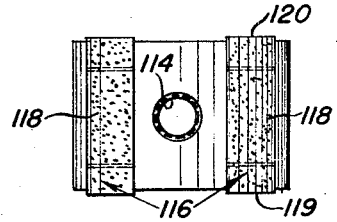
Figure 12 is a bottom plan view of the division plate assembly.
Figure 13:
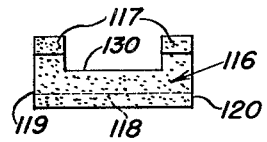
Figure 13 is a side elevation of one of the carbon blocks of the division plate assembly.
Figure 14:
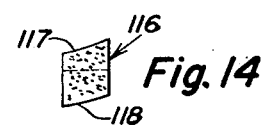
Figure 14 is an end elevation of the block of Figure 13.

Generally U-shaped blocks 116 of carbon or other solid hard graphitic or like material are mounted in recesses 112 and 113 as illustrated in Figures 10–12. As illustrated in Figures 13 and 14, each carbon block has cylindrical top and bottom surfaces 117 and 118 and parallel flat side surfaces 119 and 120.

Figure 15:
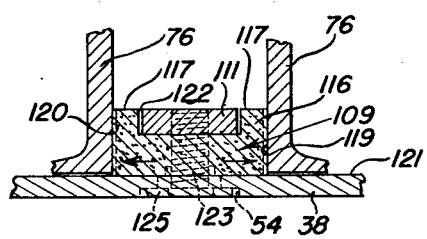
Figure 15 is a fragmental section along line 15—15 of Figure 10 illustrating the division plate in the meter assembly.

In the assembly, surface 118 is accurately cylindrical and concentric with the internal surface 121 of cylinder 38, and parallel surface 117 which is on the ends of the upwardly extending legs of each block is accurately cylindrical and concentric with the cylindrical periphery of rotor body 70. As illustrated in Figures 10 and 15, blocks 116 are so dimensioned with respect to frame 111 as to have a small play indicated at 122 that permits sliding displacement (see the arrows in Figure 15) with respect to frame 111 and substantially parallel to the axis of the meter rotor.

The flat side faces of blocks 116 and the inner flat bridge faces 130 of blocks 116 have such clearance respectively with respect to the sides of recesses 112 and 113 and the bottom surfaces of recesses 112 and 113 that the blocks 116 may slide easily with respect to frame 111 whenever the rotor shifts axially, as will appear.

The distance between end surfaces 119 and 120 of each block 116 is made accurately equal to the distance between the opposed parallel surfaces of rotor side members 76, allowing for the minimum running clearance essential to relative rotation, and this distance, as illustrated in Figure 10, is greater than the width of frame 111 so that it is not necessary to machine the sides of frame 111 to any such close tolerance. This extension of surfaces 119 and 120 beyond the sides of frame 111 is sufficiently large as to be greater than the amount of possible axial shift of the rotor on shaft 56 which might be caused by running clearance or by operating conditions. Because of this arrangement, for example, should the meter be operated with shaft 56 vertical so that wall 40 is at the bottom, the weight of the rotor is taken by bearings 90 and cannot be transmitted through blocks 116 which shift with the rotor to frame 111 which is secured to the cylinder. Thus the friction load between blocks 116 and rotor side members 76 cannot be greater than a function of the weights of blocks 116 which are quite light as compared to the rotor.

The division plate member is mounted and held in the assembly by means of a screw 123 that extends through cylinder wall opening 52. A compressible sealing ring 124 is provided about screw 123 within opening 52.

In the assembly, with screw 123 drawn tight to anchor frame 111, the lower surface 118 of each block 116 is disposed adjacent inner cylinder surface 121 but with sufficient clearance to enable the above described axial sliding of blocks 116, and the upper two part surface 117 of each block 116 is in rotating or running contact with the cylindrical periphery of rotor body 70. The end faces 119 and 120 have close running fit with the adjacent parallel surfaces of rotor side members 76.

During assembly of the meter, after the rotor and driven magnets have been assembled with shaft 56 as illustrated in Figure 4, the division plate member consisting of frame 111 and the two blocks 116 is positioned between the rotor side members 76 with spaced shims (not shown) interposed between each rotor side member and faces 119 and 120 at the adjacent sides of the division plate member. This frictionally holds the division plate member on the rotor for purposes of insertion into the cylinder, and the shims when removed leave the desired running clearances between the division plate and the rotor side members. The advantage of the above described floating mount for the blocks 116 is gained here because it is not necessary to fashion frame 111 to the exact desired spacing between the rotor side members, as blocks 116 are much more easily made to this dimension and their play with respect to frame 111 insures that the division plate member is quickly and accurately fitted onto the rotor without the necessity of a great deal of accurate machine work beforehand.

The head 125 of screw 123 is sufficiently flat and shallow to be received within counterbore 54 in the face of the cylinder wall when the screw is fully threaded into opening 114, so that head 125 is flush with or lies below the cylindrical surface of the cylinder and does not interfere with insertion of cylinder 38 into casing 10.

The rotor assembly with the division plate member held on it is axially inserted through the open end of cylinder 38 until the end 58 of shaft 56 is thrust into boss 42 of cylinder end wall 40 and the shaft arrested by abutment of stop flange 62 with boss 42. This registers bore 114 in the division plate with opening 52 in the cylinder wall, and screw 123 is inserted to secure the division plate to the cylinder. The division plate member is thus rigidly clamped against the inner face 121 of the cylinder wall between the ports and sealing ring 124 will be distorted and compressed between the screw and the sharp corner formed by the counterbored outer end 115 of opening 114. This provides a fluid tight seal of opening 52.

The division plate member 111 has a circumferential length spanning the distance between the cylinder ports 46 and 48. After screw 123 is tightened, the flexible shims are now removed by inserting a suitable implement through one of the cylinder ports and grasping the projecting ends of the shims and withdrawing them through the port. Thus a definite normal running clearance relation is established between the side members 76 of the rotor and division plate member 109, and this clearance is not disturbed whenever the cylinder is withdrawn from casing 10.

This construction permits the entire cylinder assembly to be withdrawn from casing 10 for repair or test, as in the field, without the necessity of adjusting clearances between the division plate and rotor as has heretofore been necessary.

My novel division plate assembly is of particular advantage in the meter. Only the blocks 116 need be made with careful attention to maintenance of the small tolerances for running fit of the division plate with the rotor. As above pointed out, each block 116 is preferably of a graphitic material which is hard but machinable and which maintains its dimensions and shape without distortion over all the temperatures encountered during operation of the meter. The very low coefficient of friction of the blocks with the rotor permits running clearances smaller than any heretofore obtainable in such devices. In fact it is desirable to fit surfaces 117, 119 and 120 rather tightly with the adjacent rotor surfaces whereby in initial operation the former wear down and substantially lap into the proper clearances necessary for efficient operation. The fact that blocks 116 are of graphitic composition also lubricates the relatively sliding surfaces of the rotor and division plate so that my construction provides a fit between the rotor and division plate which affords maximum sealing, minimum running clearances and self lubricated relative sliding surfaces.

During operation it is not necessary to hold the rotor assembly against such axial play as may be expected with the usual manufacturing tolerances as has heretofore been attempted in prior constructions, as the play indicated at 122 between the blocks 116 and rigid frame 111 will permit slight axial shift of the rotor assembly without disturbing the seal at surfaces 119 and 120. Hence no special devices or undue accuracy of manufacure need be provided for so fitting the assembly as to maintain this seal.

All these advantages contribute to reduce cost of manufacture and promote efficiency in repair and operation.

The cylinder 38 at its closed end is provided with an external continuous circumferential groove 126, the outer side wall of which obliquely inclined inwardly from the periphery of the cylinder as at 128. At each side of this groove parallel chamfered surfaces 130 and 132 respectively are formed on the cylinder wall.

At its open end the wall of cylinder 38 is provided with an external annular flange 134. This flange is formed with an internally opening circumferential groove 136, the outer side wall of which is outwardly inclined from the base of the groove, as at 138. At the inner side of this groove an annular shoulder 140 is formed on the cylinder wall which is also provided with an inclined surface 142 extending inwardly from said shoulder.

The internal surface of the casing 10 and the external surface of the cylinder 38 are accurately finished so that, as the cylinder with the rotor assembly is inserted to its operative position within the casing under a free sliding fit, these surfaces will have close intimate contact throughout their area. During such insertion of the rotor cylinder into casing 10 with the ports 46 and 48 in accurate alignment with inlet and outlet ports 20 and 22 respectively of the casing manifold, the chamfered surface 130 of the outer side of groove 128 first engages the sealing rings 36 projecting above the inner face of the casing wall and compresses them into grooves 28 upon the concave surfaces of filler rings 32 and, after the open sides of groove 126 passes over the sealing ring, they are also engaged by the inner chamfered surface 132 on the cylinder so that the sealing rings will not be cut or torn. The same depression and compression of the sealing rings at the opposite side thereof, as the cylinder is axially moved into the casing, occurs as these rings are successively contacted by the chamfered surfaces 130 and 132 so that when the cylinder is fully inserted, said rings are substantially uniformly compressed between the concave surfaces of filler rings 32 and the peripheral surface of the cylinder 38 around each port 46 and 48. Thus a highly effective fluid tight seal is produced between the casing and the cylinder wall. At the limit of the inward axial movement of the cylinder into the casing, the inner side of the flange 134 on the cylinder wall is in abutting contact with one end of the casing wall and the ports 46 and 48 are in accurate registration with the ports 20 and 22. It will be noted that the countersinks 50 at the outer side of the cylinder ports also prevent cutting or tearing of the sealing rings as the ports move into registration with the casing ports 20 and 22.

The other end of the cylinder 38 projects beyond the corresponding end of casing 10 and an expansible locking ring 144 is engaged in the groove 126 in the cylinder wall. This ring has an inclined outer side face 146 for wedging coaction with the inclined side wall 128 of the groove 126, the inner side face of said ring having close abutting contact with the end of the casing wall. Thus the cylinder 38 is removably but securely locked in a fixed position against rotative or axial movement relative to the casing.

The open end of the cylinder 38 is closed by an integral combined cover and housing member 148. This member comprises a cylindrical outer wall 150 formed with an outwardly directed concentric annular flange 152 at one end thereof. A re-entrant housing section 154 of relatively small diameter is integrally connected by outer end wall 156 with the other end of the cylindrical wall 150. This re-entrant housing section has a relatively thin cylindrical wall 158 and provides an annular housing compartment for receiving the driver magnets 84 when cover 148 is applied to the cylinder.

The inner closed end of the re-entrant housing section 154 of the cover is formed with a coaxial bearing and piloting boss 160 having a bore of the required diameter to receive the outer end of the rotor shaft 56, the sealing unit 106 on the shaft establishing a fluid tight barrier between shaft 56 and boss 160.

One end of a shaft 162, concentric with shaft 56, is journalled in the bore of boss 160 by an antifriction bearing 164, its other end having a relatively long reduced portion journalled in an antifriction bearing 166 in a closure plate 168 closing the outer open end of housing 154 and secured to housing 148 by suitable screws 170. At the outer side of this closure plate, a gear 172 is fixed to shaft 162 and drives a reduction gear train generally indicated at 174, mounted on plate 168.

The flange 152 of cover member 148 is provided with an annular external groove 176 to receive a compressible sealing ring 178. An annular stop shoulder 180 is formed upon the periphery of flange 152 at the outer side of groove 176. In the application of cover member 148, flange 152 has a close sliding contact with the internal surface of cylinder 38 and as the sealing ring 178 is moved against the inwardly inclined surface 142 on the cylinder wall, said ring is distorted and compressed within the groove 176 until the shoulder 180 on flange 152 abuts against the annular shoulder 140 on the cylinder wall. The driven magnet 182 which is suitably fixed on shaft 162 within housing 154 and the driving magnets 84 will then be positioned in accurate radial alignment at opposite sides of the housing wall 158 and a fluid tight closure established between the interior of cylinder 38 and cover member 148. A split expansible locking ring 184 having an inclined outer face 186 is now engaged against the outer face of flange 152 on the cover and within the groove 136 in the end flange of cylinder 38 and by the wedging coaction between said face 186 on the ring and the inclined side wall 138 of groove 136, the combined cover and housing member is securely locked against the axial displacement and in coaxial relation with cylinder 38.

Finally, a housing 188, partly illustrated in Figure 1, is secured to the outer side of the closure plate 168 and cover member 148 by means of suitable screws indicated at 190. A transmission shaft 192 of the register drive mechanism is journalled in housing 188 and carries a gear 194 meshing with an element of the speed reduction gearing 174.

From the foregoing description considered in connection with the accompanying drawings, the several novel features of the present invention may be readily understood. In Figure 1 of the drawing, the several parts are illustrated substantially in full size, and it will be seen that these parts may be easily and quickly assembled to provide a compact and accurately functioning fluid meter of this type possessing maximum stability, without excessive bulk or weight and which will withstand high pressures without deformation or failure. It is therefore admirably adapted for use in modern high speed or jet propelled aircraft where such equipment is subject to unusually severe stresses and the effects of sudden changes in temperature. The several individual parts of the mechanism are also of rugged structural form, and, in the illustrated assembly thereof, will not be functionally affected by vibration or inertia shock forces thus insuring consistently efficient operation of the meter in all positions which the aircraft may assume with respect to the horizontal. An important practical feature is the small number of parts required so that easy and quick assembly or disassembly of the meter parts with respect to the outer casing is possible for the replacement of such of the elements as may be required.

The means for sealing the inlet and outlet ports automatically as the rotor cylinder is assembled in the outer casing is not specifically claimed herein, since this feature forms the subject matter of the co-pending application of Floris Cloete, filed February 10, 1948.

It will be understood that the term meter herein as used includes motors, pumps and other devices wherein the inventive principle is applied.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid meter, an internally cylindrical casing open at its opposite ends and having circumferentially spaced inlet and outlet ports, a cylinder internally lining said casing having an open end provided with an external flange abutting an end of the casing, the other end of said cylinder projecting axially beyond the casing and having a transverse integral end wall, said cylinder having inlet and outlet ports aligned with the corresponding ports in the casing, and a substantially annular radially resilient member in abutting contact with the casing end surrounding said axially projecting end of the cylinder and releasably coacting with means thereon to removably lock said cylinder against axial movement relative to the casing.

2. A fluid meter as defined in claim 1, together with a rotor within said cylinder having a supporting shaft mounted at one of its ends in said cylinder end wall, and a fluid tight cover removably mounted on the open end of said cylinder having a piloting boss to receive and support the other end of said shaft.

3. In a fluid meter, a cylinder having an integral transverse end wall and an opposite open end, a rotor supporting shaft non-rotatably mounted at one end in said end wall and projecting toward said open end, a gear axially and non-rotatably fixed on said shaft near the open end of said cylinder, a cover member removably secured in fluid tight assembly across the open end of said cylinder and having a bore, a fluid tight mount disposed axially outwardly of said gear and supporting the other end of said shaft in said bore with axial freedom for removal of said cover without disturbing said gear position, a rotor assembly rotatably mounted on said shaft on fixed spaced bearings between said gear and the cylinder end wall, said rotor assembly having journaled thereon peripheral vanes coacting with said cylinder during rotation of said rotor assembly, an abutment on said shaft extending between said end wall and the innermost of said bearings, an axially solid spacer extending between the gear and the outermost of said bearings, and vane driving gears on said rotor assembly all meshed with said gear on the shaft.

4. In a fluid meter, a cylinder having circumferentially spaced inlet and outlet ports, a non-rotatable shaft coaxially mounted in the cylinder, a rotor rotatably mounted on said shaft within said cylinder and having an outer periphery and spaced side members, movable vanes on the rotor periphery coacting and interfitting with said cylinder and said side members to provide closed fluid chambers during rotation of the rotor, a division plate member secured within said cylinder between said ports and between said rotor side members and comprising a part having surfaces with running clearances with both said rotor periphery and said rotor side members and another part rigid with said cylinder, said parts being relatively displaceable for a small distance in the direction of the axis of said rotor whereby said rotor is permitted such normal small axial play as may result from manufacturing tolerances without disturbing its seal with the division plate member.

5. In a fluid meter, a cylinder having circumferentially spaced inlet and outlet ports, a rotatably mounted rotor assembly in the cylinder, said rotor assembly having a cylindrical periphery and a pair of spaced side members having parallel opposed side faces, movably mounted vanes on the rotor assembly periphery coacting and interfitting with said cylinder and said side member faces to provide closed fluid chambers during rotation of said rotor assembly, and a division plate assembly mounted in the cylinder between said ports and between said side members and comprising a frame part rigidly secured to said cylinder and at least one rotor contacting part mounted on said frame part with a cylindrical surface in running clearance with said rotor periphery and parallel end surfaces in running clearance with said opposed faces, said division plate assembly parts having play between them to permit a small shift of the rotor relative to said cylinder in the direction of its axis during normal operation.

6. In the fluid meter defined in claim 5, said rotor contacting part being of a hard material which has substantially no dimensional change over the range of temperatures encountered in operation of said meter.

7. In the fluid meter defined in claim 5, said rotor contacting part being of graphitic composition so as to provide self-lubricating contact with the rotor.

8. In the fluid meter defined in claim 5, a fastening element securing said frame part to the cylinder, and a plurality of said rotor contacting parts mounted on said frame part with one of said rotor contacting parts being disposed between said fastening element and each of said ports.

9. In a fluid meter, a cylinder closed at one end by a transverse wall and open at the other end, a fluid tight cover secured across the open end of said cylinder, said cover having a reentrant wall section projecting toward said transverse wall to form an annular end chamber within said cover and an outwardly open external chamber surrounded by said annular chamber, a transverse closure removably secured upon said cover across the open end of said external chamber, a rotor within the cylinder, a fixed arbor on which said rotor is rotatably mounted having its opposite ends secured in fluid tight mountings on said transverse end wall of the cylinder and the reentrant wall section of said cover, an indicator drive shaft coaxial with said rotor having its inner end journalled in said reentrant wall section and its outer end journalled in and projecting through said closure, a drive member fixed to said rotor and disposed in said annular chamber, and a driven member in said externally open chamber, one of said members being a magnet and the other being magnetically coupled thereto for rotation together.

10. In a fluid meter, a cylinder having a closed end and an open end, a fluid tight cover removably secured across said open end, a reentrant portion in said cover having at its bottom a central through bore, an arbor having one end fixed in said closed end of the cylinder and projecting coaxially toward the open end of the cylinder, said arbor being received within said bore when the cover is placed on the cylinder, a fluid tight seal between the arbor and said bore permitting ready axial separation of the arbor and cover when the cover is removed, a rotor rotatably mounted on said arbor within said cylinder, a register mounting plate removably secured across said cover, a register drive shaft extending between said plate and the cover having its opposite ends journalled in said bore and said plate, a driven magnetic coupling member secured upon said shaft between the register mounting plate and cover, and a cooperating driving magnetic coupling member secured upon said rotor.

11. In a fluid meter, a cylinder having circumferentially spaced inlet and outlet ports in its periphery, a rotor rotatably mounted in said cylinder comprising axially spaced side members having running clearance with the inner periphery of said cylinder, a plurality of relatively movable peripheral vanes shiftably mounted on said rotor and extending between said side members, said vanes interfitting and coacting with the inner periphery of said cylinder and said side members to provide closed fluid chambers during rotation of said rotor, a division plate assembly rigidly mounted on said inner periphery of the cylinder and projecting between said rotor side members into running clearance with said rotor and with opposed faces having sliding running fit with said side members, said division plate being located between said ports, a surrounding casing within which said cylinder is slidably and snugly fitted having inlet and outlet ports corresponding to those of said cylinder, said cylinder having the major portion of its external periphery in full surface engagement with the internal periphery of said casing so that said cylinder wall is substantially fully backed by said casing, an external flange on one end of said cylinder in abutment with an end of said casing, and cooperating parts on said cylinder and said casing for removably locking said cylinder against axial displacement within said casing with the inlet and outlet ports respectively of said cylinder and casing in accurately registering relation comprising a removable locking ring interposed between the other end of said cylinder and the other end of said casing.

References Cited in the file of this patent

UNITED STATES PATENTS

| Number | Name | Date |
| --- | --- | --- |
| 1,065,939 | Hanks | July 1, 1913 |
| 1,595,496 | Beggs | Aug. 10, 1926 |
| 1,691,039 | Anderson | Nov. 13, 1928 |
| 1,696,132 | Wermeille | Dec. 18, 1928 |
| 2,127,847 | Schulte | Aug. 23, 1938 |
| 2,272,170 | Gransberg et al. | Feb. 10, 1942 |
| 2,274,206 | Marsh | Feb. 24, 1942 |
| 2,294,037 | Kueher | Aug. 25, 1942 |
| 2,296,542 | Steen | Sept. 22, 1942 |
| 2,423,750 | Benson | July 8, 1947 |
| 2,487,783 | Bergman | Nov. 15, 1949 |
| 2,627,848 | Smith | Feb. 10, 1953 |

FOREIGN PATENTS

| Number | Country | Date |
| --- | --- | --- |
| 21,511 | Great Britain | A. D. 1896 |
| 512,330 | Great Britain | Sept. 1, 1939 |
| 125,984 | Australia | Oct. 31, 1947 |